(12) United States Patent
Leder et al.

(10) Patent No.: US 7,648,609 B2
(45) Date of Patent: Jan. 19, 2010

(54) ADHESIVE AND ITS USE

(75) Inventors: Herbert Leder, Sinzheim (DE); Elvira Hammer-Wolf, Feldbrunnen (CH)

(73) Assignee: Belland Technology GmbH, Pottenstein (DE)

( * ) Notice: Subject to any disclaimer, the term of this patent is extended or adjusted under 35 U.S.C. 154(b) by 82 days.

(21) Appl. No.: 11/906,250

(22) Filed: Oct. 1, 2007

(65) Prior Publication Data

US 2008/0029216 A1    Feb. 7, 2008

Related U.S. Application Data

(62) Division of application No. 10/960,269, filed on Oct. 7, 2004, now abandoned.

(30) Foreign Application Priority Data

Oct. 10, 2003   (DE) ................... 103 48 222

(51) Int. Cl.
C09J 5/02       (2006.01)
B29C 65/00      (2006.01)
B32B 37/00      (2006.01)
B32B 27/30      (2006.01)
B32B 27/38      (2006.01)

(52) U.S. Cl. .............. 156/308.6; 156/308.2; 156/325; 156/326; 156/327; 156/330

(58) Field of Classification Search .......... 156/83, 156/283, 284, 305, 308.2, 308.4, 308.6, 309.6, 156/309.9, 325, 326, 327, 330; 427/207.1, 427/208, 208.4, 336, 337, 372.2, 375, 377, 427/398.3
See application file for complete search history.

(56) References Cited

U.S. PATENT DOCUMENTS 5,863,885 A * 1/1999 Ruggieri et al. ............. 510/439
5,869,568 A   2/1999 Maeda

FOREIGN PATENT DOCUMENTS

| DE | 196 44 176 A1 | 10/1996 |
|---|---|---|
| EP | 0 032 244 B1 | 12/1980 |
| EP | 0 022 636 A1 | 1/1981 |
| EP | 0 143 935 B1 | 9/1984 |
| EP | 0 316 676 A2 | 11/1988 |
| EP | 0 353 190 A2 | 7/1989 |
| EP | 0 381 625 A2 | 1/1990 |
| EP | 0 928 316 B1 | 9/1997 |
| JP | 2000-080211 * | 3/2000 |
| JP | 2000-080235 * | 3/2000 |
| WO | WO 98/07778 A1 | 2/1998 |
| WO | WO 98/13423 A1 | 4/1998 |

OTHER PUBLICATIONS

JPO abstract of JP 2000-080235 (2000).*
JPO abstract of JP 2000-080211 (2000).*

* cited by examiner

*Primary Examiner*—Michael J Feely
(74) *Attorney, Agent, or Firm*—Boyle Fredrickson, S.C.

(57) ABSTRACT

The invention relates to the use of a two-phase polymer combination which is dissoluble in aqueous alkali and comprises a. an alkali-soluble copolymer or terpolymer of an $\alpha,\beta$-unsaturated monocarboxylic acid which possesses carboxyl groups distributed essentially uniformly over the chain of the molecule, as a continuous phase, and b. a copolymer or terpolymer which is insoluble in aqueous alkali and contains epoxy groups along its polymer chain, as a discontinuous finely disperse phase, c. free epoxy groups on the surface of the polymer particles of the discontinuous phase being linked to one another by esterification with some of the carboxyl groups of the polymer of the continuous phase, and the remaining carboxyl groups being present in unchanged form, as an adhesive.

The polymer combination, which is not tacky in the dry state, can be made tacky by supplying aqueous moisture to it.

5 Claims, No Drawings

ADHESIVE AND ITS USE

This application is a divisional application of U.S. Ser. No. 10/960,269, filed Oct. 7, 2004, now abandoned. This application also claims foreign priority to German application 10348222.9, filed Oct. 10, 2003.

The invention relates to an adhesive based on a polymer which can be made tacky in conjunction with aqueous moisture, and to its use.

Industrial products having self-adhesive properties are sufficiently well known from everyday use; examples are the wide variety of kinds of sheets and adhesive tapes, used in the packaging, construction or furniture sector and in the metal, glass and automotive industries, among others, or else office products such as adhesive strips, sticky labels or sticky notes. Common to these products is the fact that for bonding to various substrates they are coated with adhesive on one side or else, according to their specific application, on both sides.

Production, handling and also the post-use disposal of these coated self-adhesive products have a number of known drawbacks.

In the case of self-adhesives it is necessary to protect the adhesive layer with a carrier material, such as siliconized paper, so that it does not lose activity prior to use, as a result for example of contamination, or, in the case of sheets, that the sheet layers do not stick to one another. Following application the carrier material is left as non-recyclable waste and therefore constitutes a disposal problem.

The removal of adhesive sheets or sticky labels following their application, from glass or porcelain products, for example, is frequently associated with severe difficulties. Labels and sheets, for example, can only be removed manually, while removal of adhesive residues is often possible only with great effort, using organic solvents.

The specific production of tacky sheets without an adhesive coating, based on ethylene-vinyl acetate (EVA) or unplasticized polyvinyl chloride (PVC-u) and low-density polyethylenes (LDPE) with corresponding tackifiers, is also known. The bond strength of these sheets is low. Their adhesion is suitable primarily for fixing sheet to sheet, and hence they are of only limited usefulness as wrapping sheets for industrial packaging and in the packaging of foodstuffs.

There are also water-soluble adhesives. These adhesives have the drawback that if too much water is used they are diluted or become detached and then no longer stick.

The invention provides for the use of a two-phase polymer combination which is dissoluble in aqueous alkali and comprises a. an alkali-soluble copolymer or terpolymer of an $\alpha,\beta$-unsaturated monocarboxylic acid which possesses carboxyl groups distributed essentially uniformly over the chain of the molecule, as a continuous phase, and b. a copolymer or terpolymer which is insoluble in aqueous alkali and contains epoxy groups along its polymer chain, as a discontinuous finely disperse phase, c. free epoxy groups on the surface of the polymer particles of the discontinuous phase being linked to one another by esterification with some of the carboxyl groups of the polymer of the continuous phase, and the remaining carboxyl groups being present in unchanged form, as an adhesive.

The polymer combination has already been described in EP 0 928 316 B1, the content of which is hereby incorporated by reference. It is known in the form of a melt, powder and films (foils). WO 98/7778 describes alkali-dissoluble laundry detergent pouches made from films of the polymer combination.

Surprisingly it has been found that this polymer combination in the moist state is able to form an adhesive bond not only to smooth surfaces but also to textured surfaces, as for example to glass, metal surfaces, plastics, nonwovens, woven fabrics, paints, paper or else to films of the same kind. The bond formed exhibits an extremely high strength with respect to mechanical forces, after drying, even to the smooth surfaces. In the dry state the polymer itself is not tacky.

The polymer combination can be made tacky by supplying aqueous moisture to it, but is not dissolved in the process. Products comprising this polymer combination can be bonded without an additional adhesive coating or can themselves act as an adhesive. The disadvantages and restrictions described above do not occur in the case of use in accordance with the invention.

The necessary moisture can be supplied in the form of vapour or liquid, in the latter case by direct or indirect application such as spreading, dropping, pouring or spraying or in atomized form via a nozzle. Moistening in the case of a sheet can be carried out on one or both sides, in the latter case, for example, by complete immersion of the sheet material in water.

In powder form as well it is possible to use the polymer combination in accordance with the invention. In that case the powder is preferably dispersed in water and applied to the respective substrate, in particular by spraying.

Products comprising this polymer combination are stable in acidic and neutral, aqueous media, while in aqueous alkalis it is possible with particular advantage to dissolve the products completely. By acidification the polymer combination can be reprecipitated and supplied to a recycling circuit.

The invention also relates to a method of bonding articles, or bonding to articles, using the polymer combination.

It should be emphasized at this point that alkali-free aqueous moisture is enough to bring about the desired adhesive effect of the polymer combination. By adding alkaline media it is possible to dissolve the polymer combination on the surface partly or completely; preferably an alkaline medium is not provided for application in accordance with the invention.

The bond of the polymer combination to the surfaces of the afore-mentioned substrates is still sufficient even in a moist environment, provided that no substantial mechanical forces act on the bond. If, however, the bonded polymer combination is wetted with large amounts of water, the bond can be parted again. In this way the polymer combination can be removed without residue, and this constitutes a substantial advantage of application in accordance with the invention.

For films and powders comprising the polymer combination there are a multiplicity of possible applications.

In one preferred embodiment a film of the polymer combination is opaque, which can be achieved by incorporating pigments into the copolymer. Thus, for example, a white coloration is obtainable by admixing titanium dioxide. Without admixtures of pigment the films are transparent to milky. The films can be covered in places or entirely with at least one colour layer, in particular by printing. Printing inks used are preferably those which are soluble in aqueous alkali and preferably insoluble in a neutral to acidic medium. Thus films comprising the polymer combination can be used, for example, as labels without any need for coating with pressure-sensitive adhesive, such as is necessary, for example, for the labels described in EP 0 316 676 B1.

Films comprising the polymer combination can be bonded over their entire area or only in places. They are outstandingly suitable for use as a protective coating or locally bonded protective covering, particularly in the case of the transportation and temporary and long-term storage of goods and products. There is a need for protective coverings and protective coatings in numerous sectors and branches of industry, particularly in the aforementioned transport, construction, sanitary or furniture sector, or else, for example, in the glass, metal or automotive industry.

Coatings comprising the polymer combination can be produced either by bonding, in the form of a film, or else by application in the form of a dispersed powder. A further possible field of application for such coatings is that of protection against graffiti. Preference is given here to use for protecting transport means such as railway carriages.

If the polymer combination is employed in the form of a film, the thickness and width of the film are guided by the particular end use, and can be adapted accordingly. The film thickness is generally from 10 μm to 200 μm; for protective films, in particular, from 25 μm to 60 μm are sufficient. The width can be chosen arbitrarily as a function of production of the film, and is generally between 20 cm and 800 cm, in particular in the range from 50 cm to 120 cm.

The polymer combination can also be processed in the form of a hot-melt adhesive, particularly in combination with aqueous bonding. In this case as well a permanent bond is formed to smooth and textured surfaces. In conjunction with tackifying by supply of aqueous moisture it is possible to use the polymer combination both in the form of a film and in the form of a powder in a multi-stage adhesion process, in which it becomes moist in a first step and in a further step is used for hot bonding.

Moist and/or hot bonding of the polymer combination can be employed for the production of composites, particularly in connection with the manufacture of laminates. In that case the polymer combination, can on the one hand, as already outlined, be used as a straight adhesive, while on the other hand the bonded polymer acts with particular advantage as an interlayer, particularly as a water-vapour-permeable interlayer.

The adhesion mechanism on which the invention is based can be described as follows:

Films and powders comprising the polymer combination described are polar by virtue of the aforementioned free carboxyl groups which are distributed over the whole length of the polymer chain of the continuous phase. This means that they are hydrophilic, and hence possess a high affinity for water. Consequently, depending on hardness and the amount of free carboxyl groups, they are able to absorb water. In doing so, the polymer has incorporated into it water molecules, which act as plasticizers and increase the mobility of the polymer chains. Films and powders become soft and tacky and can in this state be applied to a variety of substrate surfaces. The high polarity of the polymer combination allows a firm bond to the substrates. As a result of the subsequent drying process the plasticizer effect is lost and the original state of the polymer combination is re-established. Adhesion to the substrate surface, however, is retained.

The preparation of the acrylic and/or methacrylic acid polymer takes place as described in patent EP 0928316 B1, it being possible to give preference, rather than a polymerization in the melt, to a solution polymerization in organic solvents, which can lead to molecular sizes which are favourable, in particular for the adhesive properties.

The polymer combination is preferably compounded, as described in EP 0 928 316 B1, in the melt.

Further features of the invention will emerge from the following description of preferred embodiments in conjunction with the dependent claims. In these embodiments the individual features may each be realised individually, or two or more thereof in combination with one another, in an embodiment of the invention.

EXAMPLES

The hardness and the hydrophilic nature of the two-phase polymer compound can be adjusted by way, inter alia, of the composition of the COOH-containing matrix polymer (cf. Table 1). In the monomer mixture the fraction of $\alpha,\beta$-unsaturated carboxylic acids is generally 20-40% by weight, preferably 25-35%. Esters of $\alpha,\beta$-unsaturated carboxylic acids are present in a fraction of 20-60% by weight, preferably 40-60%, and the fraction of styrene, if present, is 5-50% by weight, in particular 15-25%. As the styrene content goes up, for example, there is also a decrease in the water vapour permeability and the water absorbency of the films-adjusted accordingly.

TABLE 1

Composition and properties of the carboxyl-containing matrix polymer.

| | Matrix polymer | | | |
|---|---|---|---|---|
| | 1 | 2 | 3 | 4 |
| Butyl acrylate in % | 57.5 | 52 | 48 | 20 |
| Acrylic acid in % | 27.5 | 29 | 30 | 33 |
| | | | | (methacrylic acid) |
| Styrene in % | 15 | 19 | 22 | 47 |
| Carboxyl content in % | 16 | 17 | 18 | 18 |
| Tg in ° C. | 45 | 50 | 61 | 110 |

The weight ratio of COOH-containing polymer to epoxy-containing impact modifier in the film is from 9:1 to 1:1, in particular from 5:1 to 1.8:1.

The compounding of the carboxyl-containing polymer with the impact modifier takes place under computer control, it being possible to add very-low-density polyethylene (VLDPE), anti-blocking agents such as silica or talc, lubricants such as stearic acid, stearamide or ethylenamines and processing stabilizers from the class of the sterically hindered phenols to the mixture, at up to 10% by weight.

TABLE 2

Composition and properties of films of the two-phase polymer combination.

| | Film compound | | | | |
|---|---|---|---|---|---|
| | 1 | 2 | 3 | 4 | 5 |
| Carboxyl-containing matrix polymer in % | 55.5 | 61 | 58 | 62 | 58 |
| Epoxy-containing impact component in % | 40 | 35 | 40 | 35 | 40 |
| VLDPE in % | 2 | 2 | | 2 | |
| Lubricant in % | 1 | 2 | | 1 | 2 |
| Anti-blocking agent in % | 0.5 | | 2 | | |
| Stabilizer in % | 1 | | | | |

| | | Film A | Film B | Film C | Film D |
|---|---|---|---|---|---|
| Tensile strength MD/CD N/mm² | | 20/18 | 24/24 | 20/18 | 24/20 | 29/31 |

TABLE 2-continued

Composition and properties of films of the two-phase polymer combination.

| Breaking elongation MD/CD % | 250/300 | 240/180 | 170/180 | 230/190 | 6/7 |
|---|---|---|---|---|---|
| Water absorption % | 16 | 10 | 10 | 14 | <1 |
| Water vapour permeability g/m²/24 h | 85 | 40 | 50 | 66 | <5 |
| Tg in ° C. | 46 | 46 | 50 | 59 | 98 |

Selected films were used for adhesive tests with neutral water, the results being as follows:

TABLE 3

| Film (% styrene) | A (8) | B (11) | C (14) | D (30) |
|---|---|---|---|---|
| Glass | 1 | 2 | 2 | 5 |
| Aluminium | 1 | 3 | 4 | 5 |
| LDPE | 4 | 5 | 5 | |
| PP nonwoven | 5 | | | |
| Stationery paper | | 4 | | |
| High-gloss paper | | 4 | | |
| Steel, stainless | | 2 | | |
| Steel sheet, galvanized | | 2 | | |

Assessment of adhesion: 1 - film undetachable; 2 - film difficult to detach, partially fractures; 3 - film difficult to detach, no fracture; 4 - film easy to detach; 5 - no adhesion.

Further experiments investigated the adhesion which occurred when bonding film to film.

TABLE 4

"Film-to-film" adhesion tests. Adhesion is assessed as in Table 3.

| Film on film | A | B | C | D |
|---|---|---|---|---|
| A | 1 | 1 | 1 | 1 |
| B | 1 | 1 | 1 | 1 |
| C | 1 | 2 | 4 | 5 |
| D | 1 | 1 | 5 | 5 |

By moistening with 0.5% strength sodium hydroxide solution it is also possible for films A, B and C to be bonded effectively to aluminium, stationery paper and galvanized steel sheet. The adhesion is unaffected by accelerated drying in a drying cabinet at 40° C.

The invention claimed is:

1. A method for bonding a two-phase polymer combination dissoluble in aqueous alkali to a surface of at least one substrate, said two-phase polymer combination consisting essentially of
   a. an alkali-soluble copolymer or terpolymer of an α, β-unsaturated monocarboxylic acid which possesses carboxyl groups distributed essentially uniformly over the chain of the molecule, as a continuous phase, and
   b. a copolymer or terpolymer which is insoluble in aqueous alkali and contains epoxy groups along its polymer chain, as a discontinuous finely disperse phase,
   wherein free epoxy groups on the surface of the polymer particles of the discontinuous phase are linked by esterification with some of the carboxyl groups of the polymer of the continuous phase, and the remaining carboxyl groups are present in unchanged form, comprising the steps of:
   providing said two-phase polymer combination, supplying aqueous moisture to said polymer combination, and
   applying the moist polymer combination to said surface of said at least one substrate; and
   wherein the polymer combination is applied in the form of a film.

2. Method according to claim 1 wherein aqueous moisture is supplied to one side of the film to provide it for bonding on said side.

3. Method according to claim 1 wherein aqueous moisture is supplied to both sides of the film to provide it for both-side bonding.

4. Method according to claim 1 wherein aqueous moisture is supplied to the entire area of the film providing it for bonding over its entire area.

5. Method according to claim 1 wherein aqueous moisture is supplied to certain places of the film providing it for bonding only in said places.

* * * * *